United States Patent
Goredema et al.

(10) Patent No.: US 9,752,040 B2
(45) Date of Patent: Sep. 5, 2017

(54) NANOSILVER INK COMPOSITIONS COMPRISING POLYSTYRENE ADDITIVES

(71) Applicant: Xerox Corporation, Norwalk, CT (US)

(72) Inventors: Adela Goredema, Ancaster (CA); Yiliang Wu, Oakville (CA); Barkev Keoshkerian, Thornhill (CA); Jenny Eliyahu, Maple (CA); Cuong Vong, Hamilton (CA); Biby Esther Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/594,746

(22) Filed: Jan. 12, 2015

(65) Prior Publication Data

US 2016/0200931 A1    Jul. 14, 2016

(51) Int. Cl.
| | |
|---|---|
| C09D 125/06 | (2006.01) |
| C09D 11/52 | (2014.01) |
| C09D 11/037 | (2014.01) |
| C09D 11/106 | (2014.01) |
| C09D 7/00 | (2006.01) |

(52) U.S. Cl.
CPC ............ *C09D 11/52* (2013.01); *C09D 11/037* (2013.01); *C09D 11/106* (2013.01); *C09D 125/06* (2013.01); *C09D 7/001* (2013.01)

(58) Field of Classification Search
CPC ....... C09D 125/06; C09D 7/001; C09D 11/52
See application file for complete search history.

(56) References Cited

U.S. PATENT DOCUMENTS

| | | | |
|---|---|---|---|
| 7,270,694 B2 | 9/2007 | Li et al. | |
| 8,324,294 B2* | 12/2012 | Wu | ........................ C09D 7/001 106/31.13 |
| 8,765,025 B2 | 7/2014 | Wu et al. | |
| 8,834,965 B2 | 9/2014 | Mokhtari et al. | |
| 2012/0205630 A1* | 8/2012 | Wigglesworth | .... H01L 51/0074 257/40 |
| 2012/0232206 A1* | 9/2012 | Wu | ........................ C09D 7/001 524/440 |
| 2014/0312284 A1 | 10/2014 | Liu et al. | |

OTHER PUBLICATIONS

Eastman "Eastman Tackifier Center—Understanding Block Copolymer" Accessed Apr. 26, 2016, p. 1. http://www.eastman.com/Markets/Tackifier_Center/Pages/Block_Copolymer.aspx.*

(Continued)

*Primary Examiner* — Blake A Tankersley
*Assistant Examiner* — Michael Robinson
(74) *Attorney, Agent, or Firm* — Marylou J. Lavoie, Esq. LLC

(57) ABSTRACT

A nanosilver ink composition including silver nanoparticles; polystyrene; and an ink vehicle. A process for preparing a nanosilver ink composition comprising combining silver nanoparticles; polystyrene; and an ink vehicle. A process for forming conductive features on a substrate using flexographic and gravure printing processes comprising providing a nanosilver ink composition comprising silver nanoparticles; polystyrene; and an ink vehicle; depositing the nanosilver ink composition onto a substrate to form deposited features; and heating the deposited features on the substrate to form conductive features on the substrate.

19 Claims, 4 Drawing Sheets

(56) References Cited

OTHER PUBLICATIONS

Naveen Chopra, et al., U.S. Appl. No. 14/188,284, filed Feb. 24, 2014, "High Silver Content Nanosilver Ink for Gravure and Flexographic Printing Applications," not yet published.
Adela Goredema, et al., U.S. Appl. No. 14/594,746, filed Dec. 17, 2014, "Nanosilver Ink Compositions Comprising Polystyrene Additives," not yet published.
Adela Goredema, et al., U.S. Appl. No. 14/573,191, filed Jan. 12, 2015, "Nanosilver Ink Compositions Comprising Clay Additives," not yet published.
Adela Goredema, et al., U.S. Appl. No. 14/630,899, filed Feb. 25, 2015, "Gravure Printing Process Using Silver Nanoparticle Inks for High Quality Conductive Features," not yet published.

\* cited by examiner

NANOSILVER INK COMPOSITIONS COMPRISING POLYSTYRENE ADDITIVES

BACKGROUND

Disclosed herein is a nanosilver ink composition. More particularly, disclosed herein is a nanosilver ink composition comprising silver nanoparticles; polystyrene; and an ink vehicle.

Xerox Corporation has invented a nanosilver particle which is stabilized by an organoamine. U.S. Pat. No. 8,765,025, which is hereby incorporated by reference herein in its entirety, describes a metal nanoparticle composition that includes an organic-stabilized metal nanoparticle and a solvent in which the solvent selected has the following Hansen solubility parameters: a dispersion parameter of about 16 MPa$^{0.5}$, or more, and a sum of a polarity parameter and a hydrogen bonding parameter of about 8.0 MPa$^{0.5}$ or less. U.S. Pat. No. 7,270,694, which is hereby incorporated by reference herein in its entirety, describes a process for preparing stabilized silver nanoparticles comprising reacting a silver compound with a reducing agent comprising a hydrazine compound by incrementally adding the silver compound to a first mixture comprising the reducing agent, a stabilizer comprising an organoamine, and a solvent.

U.S. patent application Ser. No. 13/866,704, which is hereby incorporated by reference herein in its entirety, describes stabilized metal-containing nanoparticles prepared by a first method comprising reacting a silver compound with a reducing agent comprising a hydrazine compound by incrementally adding the silver compound to a first mixture comprising the reducing agent, a stabilizer comprising an organoamine, and a solvent. U.S. patent application Ser. No. 14/188,284, which is hereby incorporated by reference herein in its entirety, describes conductive inks having a high silver content for gravure and flexographic printing and methods for producing such conductive inks.

Inks have been successfully formulated in non-polar solvents such as decalin and bicyclohexyl and successfully printed using inkjet printing technologies. As printed electronics matures and moves to higher volume production, it is desirable to have inks that can be used in offset printing technologies such as flexography and gravure. Offset printing technologies provide ready established printing processes and equipment. FIG. 1 shows a schematic diagram of a flexographic printing process. Flexographic printing processes generally comprise the following steps: a) anilox roller 100 having metered anilox cells 112 picks up ink from the ink pan 114; b) doctor blade 116 scrapes off excess ink; c) ink is then deposited on to the flexo-plate 118; d) flexo plate 118 and plate cylinder 120 transfer features onto the substrate (material web) 122 shown exiting impression cylinder 124.

A gravure printing process is very similar to flexography except that it does not have an anilox roller and the image is engraved onto a metal cylinder. This makes gravure more expensive than flexo and high volume printing. One of the main advantages of gravure over flexo is the ability to consistently make high quality prints. FIG. 2 shows a schematic diagram of a gravure printing process. Gravure processes generally comprise the following steps: a) plate 200 comprising plate cylinder 212 picks up ink 214 from the ink pan; b) doctor blade 216 scrapes off excess ink; c) ink is then transferred from the plate cylinder 212 to the substrate (paper) 218 shown exiting impression cylinder 220 having printed image 222 printed thereon.

Current inks include high loadings of silver nanoparticles, such as from about 50 to about 70 percent. Such inks have a very low viscosity, such as from about 8 to about 12 centipoise and typically greater than about 10 centipoise.

Gravure and flexographic processes provide a potentially efficient way to manufacture a number of conductive components at a lower cost than that of other printing applications. However, when used for flexographic printing, the low viscosity of current ink compositions results in very thin films, such as less than about 500 nanometers, and a minimum line width of about 125 nanometers. Thin, highly conductive films are good for certain applications such as memory devices.

However, there are a number of applications that require thicker films, such as RFID (Radio Frequency Identification) antennas which require a film having a thickness of about 10 to about 20 micrometers. When low viscosity ink is used in gravure printing processes, the ink overspreads. Higher viscosity ink is desired to print thicker films and to improve line resolution for flexographic printing and to prevent smearing for gravure printing. The current method for increasing ink viscosity is to increase silver loading, such as to about 65 to about 75 percent. However, this is a costly solution which does not provide an adequate increase to ink viscosity.

A need remains for an improved ink composition that can provide an adequate ink viscosity without negatively impacting ink performance. Further, a need remains for inks that can be successfully employed in offset technologies for printed electronics applications. Further, a need remains for inks that can be successfully employed in offset technologies for printed electronics applications including gravure and flexographic printing processes.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a nanosilver ink composition comprising silver nanoparticles; polystyrene; and an ink vehicle.

Also described is a process for preparing a nanosilver ink composition comprising combining silver nanoparticles; polystyrene; and an ink vehicle.

Also described is a process comprising providing a nanosilver ink composition comprising silver nanoparticles; polystyrene; and an ink vehicle; depositing the nanosilver ink composition onto a substrate to form deposited features; and heating the deposited features on the substrate to form conductive features on the substrate. In embodiments, the process comprises flexographic printing or gravure printing.

DETAILED DESCRIPTION

Figure 1:
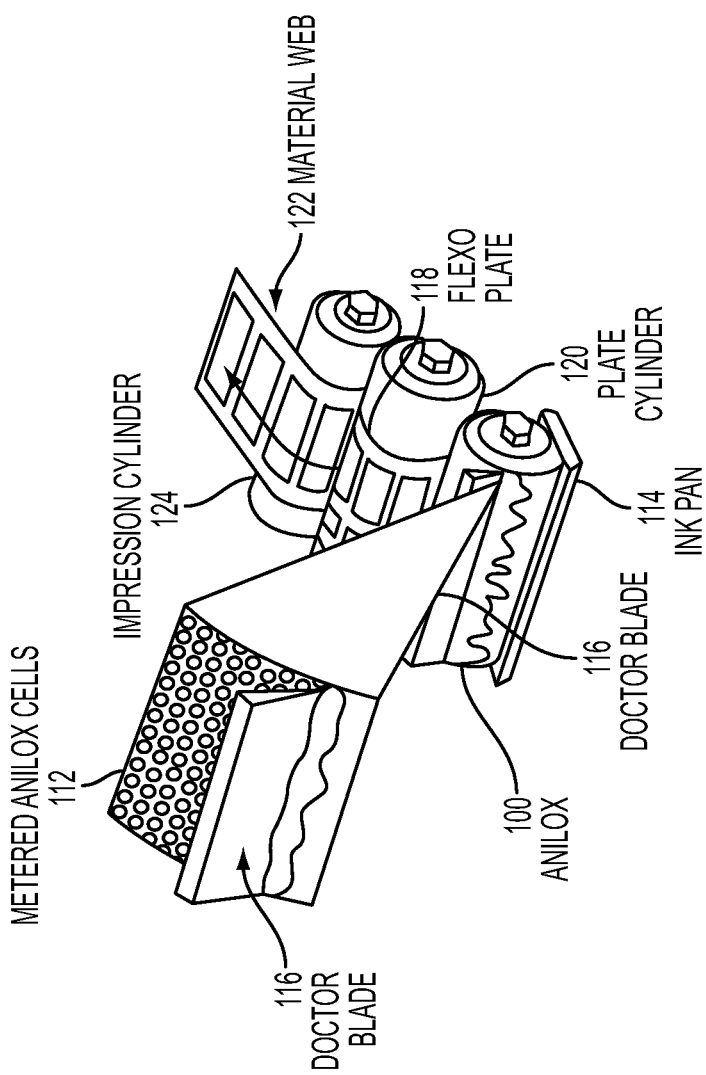
FIG. 1 is a schematic diagram of a flexographic printing process.
Figure 2:
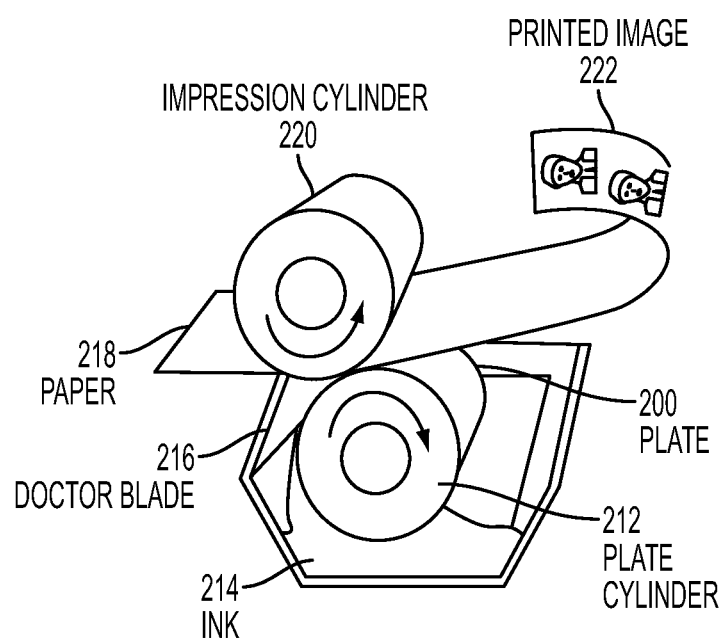
FIG. 2 is a schematic diagram of a gravure printing process.

A nanosilver ink composition comprising silver nanoparticles; polystyrene; and an ink vehicle is provided. The present nanosilver ink compositions include, in embodiments, silver nanoparticles in non-polar solvents with poly (4-methylstyrene) additives. It was surprisingly found that adding polystyrene to the nanosilver ink composition significantly increased ink viscosity and dramatically improved print quality. The amount of additive was systematically studied. It was surprisingly found that a nanosilver ink composition comprising about 1 weight percent polystyrene resulted in an ink having both high viscosity and high conductivity. In embodiments, gravure printed lines were integrated as electrodes in p-type transistor devices indicating that the polystyrene had no adverse effect on transistor performance.

Silver Nanoparticles. The ink composition herein comprises silver nanoparticles. The silver nanoparticles may have any shape or geometry. In embodiments, the silver nanoparticles have a spherical shape. The silver nanoparticles can have a diameter in the submicron range. In embodiments, the silver nanoparticles have a volume average particle size of from about 0.5 to about 100 nanometers (nm), or from about 1.0 to about 50 nm, or from about 1.0 to about 20 nm. The characteristics of the silver nanoparticles may be determined by any suitable technique and apparatus. Volume average particle diameter may be measured by means of a measuring instrument such as a light scattering particle sizer, operated in accordance with the manufacturer's instructions. Volume average particle diameter may also be measured by means of a measuring instrument such as a Beckman Coulter Multisizer 3, operated in accordance with the manufacturer's instructions.

The silver nanoparticles may be elemental silver, a silver alloy, or a combination thereof. In embodiments, the silver nanoparticles may be a base material coated or plated with pure silver, a silver alloy, or a silver compound. For example, the base material may be copper flakes with silver plating. The silver alloy may be formed from at least one metal selected from Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th, Mg, Ca, Sr, and Ba, although not limited.

In embodiments, the silver compound may include either or both of (i) one or more other metals and (ii) one or more non-metals. Suitable other metals include, for example, Al, Au, Pt, Pd, Cu, Co, Cr, In, and Ni, particularly the transition metals, for example, Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include, for example, Si, C, and Ge. In certain embodiments the silver nanoparticles are composed of elemental silver. In embodiments, the silver particles can be selected from those described in U.S. patent application Ser. No. 14/188,284, which is hereby incorporated by reference herein in its entirety.

The silver nanoparticles can be stabilized metal-containing nanoparticles as described in U.S. patent application Ser. No. 13/866,704, which is hereby incorporated by reference herein in its entirety. In embodiments, the stabilized metal-containing nanoparticles are prepared by a first method comprising reacting a silver compound with a reducing agent comprising a hydrazine compound by incrementally adding the silver compound to a first mixture comprising the reducing agent, a stabilizer comprising an organoamine, and a solvent. In embodiments, the stabilized metal-containing nanoparticles are prepared by a second method comprising reacting a silver compound with a reducing agent comprising providing a second reaction mixture of the silver compound and the stabilizer, and adding the reducing agent to the second reaction mixture, wherein the silver compound, the stabilizer, and the reducing agent are the same in the first method and the second method. Stabilized metal-containing nanoparticles that contain silver and/or a silver alloy composite are prepared by reacting a silver compound and/or a silver complex with a reducing agent at a temperature between about 20° C. and about 60° C. The reaction is carried out by incrementally adding the silver compound or a mixture of the silver compound and a stabilizer to a solution containing (a) the reducing agent, which includes a hydrazine compound, (b) a stabilizer, which includes an organoamine, and (c) a solvent. Stabilized silver nanoparticles can be prepared by a process including (a) providing a mixture of a reducing agent, a stabilizer, and a solvent; and (b) (i) incrementally adding a silver compound to the mixture or (ii) incrementally adding a complex comprising a silver compound and an organoamine stabilizer to the mixture, wherein the temperature of the mixture is maintained below about 60° C., and wherein a soluble silver ion concentration remains low in the mixture. For further detail, see U.S. patent application Ser. No. 13/866,704.

The silver nanoparticles can be stabilized metal-containing nanoparticles prepared as described in U.S. Pat. No. 7,270,694, which is hereby incorporated by reference herein in its entirety. In embodiments, the silver nanoparticles can be prepared by a process comprising reacting a silver compound with a reducing agent comprising a hydrazine compound in the presence of a thermally removable stabilizer in a reaction mixture comprising the silver compound, the reducing agent, the stabilizer, and an optional solvent, to form a plurality of silver-containing nanoparticles with molecules of the stabilizer on the surface of the silver-containing nanoparticles. For further detail, see U.S. Pat. No. 7,270,694.

The silver nanoparticles can comprise a silver nanoparticle composition comprising solvents with specific Hansen solubility parameters as described in U.S. Pat. No. 8,765,025, which is hereby incorporated by reference herein in its entirety. In embodiments, the metal nanoparticle composition includes an organic-stabilized metal nanoparticle and a solvent in which the solvent selected has the following Hansen solubility parameters: a dispersion parameter of about 16 $MPa^{0.5}$, or more, and a sum of a polarity parameter and a hydrogen bonding parameter of about 8.0 $MPa^{0.5}$ or less. The metal nanoparticle composition is suitable for printing conductive lines that are uniform, smooth and narrow on various substrate surfaces. The metal nanoparticle composition is able to form printed conductive features having a coffee ring effect ratio of about 1.2 to about 0.8, a surface roughness of about 15 or less and a line width of about 200 microns or less. In embodiments, the metal nanoparticle is a silver nanoparticle having a stabilizer associated with a surface of the silver nanoparticle. The silver nanoparticle can, in embodiments, be selected from the group consisting of silver, silver-copper composite, silver-gold-copper composite, silver-gold-palladium composite, and combinations thereof. In embodiments, the stabilizer is an organoamine stabilizer. In embodiments, the organoamine stabilizer can be selected from the group consisting of nonylamine, decylamine, hexadecylamine, undecylamine, dodecylamine, tridecylamine, tetradecylamine, and combinations thereof. In certain embodiments, the silver nanoparticle is one having a stabilizer associated with a surface of the silver nanoparticle, the stabilizer consisting of an organoamine stabilizer, and a solvent, wherein the organoamine stabilizer is a primary alkylamine having at least 9 carbon atoms, wherein the solvent is one or more of decahydronaphthalene, cis-decahydronaphthalene and trans-decahydronaphthalene, and wherein a silver content in the silver nanoparticle is form about 80 weight percent to about 95 weight percent based on the total weight of the silver nanoparticle and the organoamine stabilizer. For further detail, see U.S. Pat. No. 8,765,025.

The silver nanoparticles can be present in the ink composition in any suitable or desired amount. In embodiments, the silver nanoparticles can be present in the ink in an amount of from about 35 to about 80 percent, or from about 40 to about 75 percent, or from about 50 to about 70 percent, based on the total weight of the ink composition.

The silver nanoparticles can be included in the ink composition in the form of a silver concentrate. The silver concentrate can comprise the selected silver nanoparticles and a solvent. The solvent can be selected from any suitable or desired solvent that can form the silver concentrate and be compatible with the other ink components. In embodiments, the silver concentrate solvent can be selected from the group consisting of decalin, bicyclohexyl, tetralin, ISOPAR® (refined mineral spirits solvents available from Exxon), xylene, N,N-dimethylaniline, hexadecane, toluene, tetradecane, methyl naphthalene, tetrahydronaphthalene, tetramethyl benzene, ethyl benzene, and the like, and mixtures and combinations thereof. The silver concentrate can be formed by combining the solvent and the silver nanoparticles, optionally in a high speed mixer, stirring, optionally while maintaining the temperature at about 20° C. such as with cold water through a jacketed beaker, optionally with bubbling nitrogen through the dispersion. The silver nanoparticles can optionally be added in the form of a premade silver nanoparticle. In embodiments, the silver nanoparticle can be prepared as described in U.S. Pat. No. 8,765,025 or U.S. patent application Ser. No. 13/866,704, each of which are hereby incorporated by reference herein in their entireties.

Polystyrene. The ink composition herein includes polystyrene. A number of polymer additives were explored as ink vehicles or binders to increase ink viscosity. Most polymer additives showed an increase in ink viscosity. However, certain polymer additives, such as polyvinylbutyrals (PVBs) increased ink viscosity but had a negative impact on ink conductivity. It was surprisingly found that polystyrene solution in a non-polar solvent increased ink viscosity and did not significantly decrease ink conductivity.

The polystyrene can be present in the ink composition at any suitable or desired amount. In embodiments, the polystyrene is provided in the ink composition in an amount of from about 0.1 to about 2, or from about 0.2 to about 1.75, or from about 0.3 to about 1.5 percent by weight based on the total weight of the ink composition. In embodiments, polystyrene is present in the ink composition in an amount of about 1 percent by weight based on the total weight of the ink composition.

Any suitable or desired polystyrene can be selected for the ink composition. In embodiments, the polystyrene comprises poly(4-methylstyrene), poly(4-tert-butyl styrene), poly(4-ethylstyrene-co-divinylbenzene), polystyrene (MW 140,000-280,000), polystyrene-b-polyisoprene-b-polystyrene, and mixtures and combinations thereof.

In a specific embodiment, the polystyrene is poly(4-methylstyrene). In another embodiment, the polystyrene is poly(4-methylstyrene) and the ink vehicle is decalin. In a more specific embodiment, the polystyrene is poly(4-methylstyrene) and the ink vehicle is a mixture of decalin and bicyclohexyl.

Ink Vehicle. The ink composition herein comprises an ink vehicle. Any suitable or desired ink vehicle can be selected. In embodiments, the ink vehicle can include a solvent. In embodiments, the ink vehicle is a non-polar organic solvent. The solvent can be used as a vehicle for dispersion of the silver nanoparticles to minimize or prevent the silver nanoparticles from agglomerating and/or optionally providing or enhancing the solubility or dispersibility of silver nanoparticles.

Any suitable or desired solvent can be selected. In embodiments, two or more solvents can be used. In embodiments, the solvent can be a non-polar organic solvent selected from the group consisting of hydrocarbons such as alkanes, alkenes, alcohols having from about 7 to about 18 carbon atoms such as undecane, dodecane, tridecane, tetradecane, hexadecane, 1-undecanol, 2-undecanol, 3-undecanol, 4-undecanol, 5-undecanol, 6-undecanol, 1-dodecanol, 2-dodecanol, 3-dedecanol, 4-dedecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; alcohols such as terpineol (α-terpineol), β-terpineol, geraniol, cineol, cedral, linalool, 4-terpineol, 3,7-dimethylocta-2,6-dien-1ol, 2-(2-propyl)-5-methyl-cyclohexane-1-ol; isoparaffinic hydrocarbons such as isodecane, isododecane; commercially available mixtures of isoparaffins such as Isopar™ E, Isopar™ G, Isopar™ H, Isopar™ L, Isopar™ V, Isopar™ G, manufactured by Exxon Chemical Company; Shellsol® manufactured by Shell Chemical Company; Soltrol® manufactured by Chevron Phillips Chemical Company; Begasol® manufactured by Mobil Petroleum Co., Inc.; IP Solvent 2835 manufactured by Idemitsu Petrochemical CO., Ltd; naphthenic oils; aromatic solvents such as benzene, nitrobenzene, toluene, ortho-, meta-, and para-xylene, and mixtures thereof; 1,3,5-trimethylbenzene (mesitylene); 1,2-, 1,3-, and 1,4-dichlorobenzene and mixtures thereof, trichlorobenzene; cyanobenzene; phenylcyclohexane and tetralin; aliphatic solvents such as isooctane, nonane, decane, dodecane; cyclic aliphatic solvents such as bicyclohexyl and decalin; and mixtures and combinations thereof. In embodiments, the ink vehicle comprises a member of the group consisting of decalin, bicyclohexyl, xylene, hexadecane, toluene, tetradecane, methyl naphthalene, tetrahydronaphthalene, tetramethyl benzene, ethyl benzene, and mixtures and combinations thereof. In a specific embodiment, the ink vehicle is decalin. In a more specific embodiment, the ink vehicle is a mixture of decalin and bicyclohexyl.

The ink vehicle can be present in the ink composition in any suitable or desired amount. In embodiments, the ink vehicle is present in an amount of from about 5 to about 50 weight percent, or from about 10 to about 40 weight percent, or from about 10 to about 30 weight percent, based on the total weight of the nanosilver ink composition.

In embodiments, the ink composition is a high-viscosity composition. In embodiments, the ink disclosed herein has a viscosity of from about 8 to about 100, or from about 10 to about 80, or from about 15 to about 60 centipoise at a temperature of about 25° C. In embodiments, the ink has a viscosity of from about 15 to about 60 centipoise at a temperature in the range of from about 20 to about 30° C. and shear rate of from about 40 to about 400 s$^{-1}$.

The nanosilver ink compositions can be prepared by any suitable or desired method. In embodiments, the nanosilver ink compositions can be prepared by combining silver nanoparticles; polystyrene; and an ink vehicle, as described herein, with optional stirring, optionally with roll milling.

The nanosilver ink compositions can be employed in any suitable or desired printing process. A process herein comprises providing a nanosilver ink composition comprising silver nanoparticles; polystyrene; and an ink vehicle; depositing the nanosilver ink composition onto a substrate to form deposited features, an ink image, or a combination thereof. The printing process can comprise a flexographic printing process or a gravure printing process. In embodiments, the process further comprises heating the deposited features on the substrate to form conductive features on the substrate.

In embodiments, the nanosilver ink compositions are used in a flexographic printing process. For example, in embodiments, a flexographic printing process herein comprises using the present nanosilver ink compositions in a flexographic printing process comprising the following steps: a) using an anilox roller having metered anilox cells to pick up ink from an ink supply such as an ink pan; b) optionally, using a doctor blade to scrape off excess ink; c) depositing ink on to a flexographic plate; d) transferring the deposited ink from the flexographic plate onto a substrate, such as a material web.

In further embodiments, the nanosilver ink compositions are used in a gravure printing process. For example, in embodiments, a gravure printing process herein comprises using the present nanosilver ink compositions in a gravure printing process comprising the following steps: a) using a plate to pick up ink from an ink supply such as an ink pan; b) optionally, scraping off excess ink with a doctor blade; c) transferring the ink from a plate cylinder to a substrate (such as paper); exiting the substrate from an impression cylinder having a printed image printed thereon.

In embodiments, a process for forming conductive features on a substrate herein comprises providing a nanosilver ink composition comprising silver nanoparticles; polystyrene; and an ink vehicle; depositing the nanosilver ink composition onto a substrate to form deposited features; and heating the deposited features on the substrate to form conductive features on the substrate. In embodiments, the process for forming conductive features on a substrate comprises a flexographic printing process or a gravure printing process.

The fabrication of conductive features, such as an electrically conductive element, from the nanosilver ink composition can be carried out by depositing the composition on a substrate using any suitable deposition technique including flexographic and gravure printing processes at any suitable time prior to or subsequent to the formation of other optional layer or layers on the substrate. Thus deposition of the nanosilver ink composition on the substrate can occur either on a substrate or on a substrate already containing layered material, for example, a semiconductor layer and/or an insulating layer.

The substrate upon which the metal features are deposited may be any suitable substrate including silicon, glass plate, plastic film, sheet, fabric, or paper. For structurally flexible devices, plastic substrates such as polyester, polycarbonate, polyimide sheets, and the like, may be used. The thickness of the substrate can be any suitable thickness such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

Heating the deposited nanosilver ink composition can be to any suitable or desired temperature, such as to from about 70° C. to about 200° C., or any temperature sufficient to induce the metal nanoparticles to "anneal" and thus form an electrically conductive layer which is suitable for use as an electrically conductive element in electronic devices. The heating temperature is one that does not cause adverse changes in the properties of previously deposited layers or the substrate. In embodiments, use of low heating temperatures allows use of low cost plastic substrates which have an annealing temperature of below 200° C.

The heating can be for any suitable or desire time, such as from about 0.01 second to about 10 hours. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to (1) anneal the metal nanoparticles and/or (2) remove the optional stabilizer from the metal nanoparticles. Examples of heating techniques include thermal heating (for example, at hot plate, an oven, and a burner), infra-red ("IR") radiation, laser beam, flash light, microwave radiation, or ultra-violet ("UV") radiation, or a combination thereof.

In embodiments, after heating, the resulting electrically conductive line has a thickness ranging from about 0.1 to about 20 micrometers, or from about 0.15 to about 10 micrometers. In certain embodiments, after heating, the resulting electrically conductive line has a thickness of from about 0.25 to about 5 micrometers.

In, embodiments, the ink composition herein has a bulk conductivity that is more than about 50,000 S/cm. The conductivity of the resulting metal element produced by heating the deposited nanosilver ink composition is, for example, more than about 100 Siemens/centimeter (S/cm), more than about 1,000 S/cm, more than about 2,000 S/cm, more than about 5,000 S/cm, more than about 10,000 S/cm, or more than about 50,000 S/cm.

The resulting elements can be used for any suitable or desired application, such as for electrodes, conductive pads, interconnects, conductive lines, conductive tracks, and the like, in electronic devices such as thin film transistors, organic light emitting diodes, RFID tags, photovoltaic, displays, printed antenna, and other electronic devise which required conductive elements or components.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of Silver Concentrate. To a jacketed beaker was added decalin (35 grams) (Evonik Industries) and then stirred with a high speed mixer at 2000 RPM. To this was added silver nano paste (200 grams) (91.32% Ash, prepared according to the procedure described in U.S. Pat. No. 7,270,694, which is hereby incorporated by reference herein in its entirety, over 5 minutes allowing the paste to be dispersed by the mixer. After the addition the dispersion was maintained at 20° C. with cold water through the jacketed beaker while bubbling nitrogen through the dispersion. After 6 hours the concentrate was poured into a glass bottle to afford 175 grams of silver concentrate having 79.80% silver content.

Example 2

Preparation of Poly(4-methylstyrene) Solution in Decalin. Into a clean 50 milliliter beaker were added the following: 2 grams of poly(4-methylstyrene) from Sigma-Aldrich® and 18 grams decalin (99.6% purity) from Evonik Industries. The mixture was stirred at 100° C. for about 1 hour during which the poly(4-methylstyrene) dissolved. The solution was cooled down to room temperature. The solution had a viscosity of 16.85 centipoise at 100 $s^{-1}$.

Example 3

Preparation of Ink Example 1. To a 120 milliliter plastic bottle was added 48.93 grams of silver concentrate from Example 1. This was followed by bicyclohexyl solvent (11.16 grams) (Solutia, Eastman Chemical Company). Glass beads (23.46 grams) were added to the mixture. The sample was purged with argon, tightly sealed using 3M® 764 vinyl green tape and roll-milled at 175 RPM for 1.5 hours. Ink rheology was measured using Ares G2 Rheometer from TA instruments using a 40 millimeter cone. A rate sweep was run from 1000 to 4 $S^{-1}$ at 25° C. Table 1 below shows ink formulations and Table 2 shows ink properties.

Example 4

Preparation of Ink Example 2. To a 30 milliliter plastic bottle was added 12.23 grams of silver concentrate from Example 1. This was followed by decalin solvent (2.13 grams) and bicyclohexyl solvent (0.67 grams). Glass beads (6.30 grams) were added to the mixture. The sample was purged with argon, tightly sealed using 3M® 764 vinyl green tape and roll-milled at 175 RPM for 1.5 hours. Ink rheology was measured using Ares G2 Rheometer from TA instruments using a 40 millimeter cone. A rate sweep was run from 1000 to 4 $S^{-1}$ at 25° C. Table 1 below shows ink formulations and Table 2 shows ink properties.

Example 5

Preparation of Ink Example 3. To a 30 milliliter plastic bottle was added 0.76 grams of poly(4-methylstyrene) solution from Example 2. This was followed by 12.23 grams of silver concentrate from Example 1, decalin solvent (1.38 grams) and bicyclohexyl solvent (0.69 grams). Glass beads (6.30 grams) were added to the mixture. The sample was purged with argon, tightly sealed using 3M® 764 vinyl green tape and roll-milled at 175 RPM for 1.5 hours. Ink rheology was measured using Ares G2 Rheometer from TA instruments using a 40 millimeter cone. A rate sweep was run from 400 to 4 $S^{-1}$ at 25° C. Table 1 below shows ink formulations and Table 2 shows ink properties.

Examples 6, 7, and 8

Preparation of Ink Examples 4, 5, and 6. Ink Examples 4, 5, and 6 were prepared in the same way as Ink Example 2 (Example 4) except that different amounts of the poly(4-methylstyrene) solution were used. Table 1 below shows ink formulations and Table 2 shows ink properties.

TABLE 1

| Ink Component | Ink Example 1 Wt % | Ink Example 2 Wt % | Ink Example 3 Wt % | Ink Example 4 Wt % | Ink Example 5 Wt % | Ink Example 6 Wt % |
| --- | --- | --- | --- | --- | --- | --- |
| Silver Concentrate | 81.45 | 81.45 | 81.45 | 81.45 | 81.45 | 81.45 |
| Decalin | — | 14.16 | 9.23 | 6.76 | 4.30 | 1.84 |
| Bicyclohexyl | 18.55 | 4.39 | 4.32 | 4.29 | 4.25 | 4.21 |
| 10% Poly (4-methylstyrene) in Decalin | — | — | 5.00 | 7.50 | 10.00 | 12.50 |
| Total | 100 | 100 | 100 | 100 | 100 | 100 |
| Decalin in Ag Concentrate | 12.20 | 12.20 | 12.20 | 12.20 | 12.20 | 12.20 |
| Decalin in Poly (4-methylstyrene) Solution | — | — | 4.50 | 6.75 | 9.00 | 11.25 |
| Total Decalin | 12.20 | 26.36 | 25.93 | 25.71 | 25.50 | 25.29 |
| Decalin:Bicyclohexyl Ratio | 0.66 | 6.00 | 6.00 | 5.99 | 6.00 | 6.01 |

TABLE 2

| Property | Ink Example 1 | Ink Example 2 | Ink Example 3 | Ink Example 4 | Ink Example 5 | Ink Example 6 |
| --- | --- | --- | --- | --- | --- | --- |
| Viscosity (centipoise) (100 $S^{-1}$) | 20.65 | 8.86 | 16.69 | 25.24 at 95 $s^{-1}$ | 51.20 | 53.68 at 95 $s^{-1}$ |

TABLE 2-continued

| Property | Ink Example 1 | Ink Example 2 | Ink Example 3 | Ink Example 4 | Ink Example 5 | Ink Example 6 |
|---|---|---|---|---|---|---|
| % Poly (4-methylstyrene) | 0 | 0 | 0.50 | 0.75 | 1.00 | 1.25 |
| % Ag Expected | 64.98 | 64.95 | 64.83 | 64.87 | 64.98 | 64.93 |
| % Ag (Ash) | 63.47 | 65.27 | 66.58 | Not measured | 63.97 | Not measured |

The viscosity data were obtained at 25° C. on an Ares G2 Rheometer from TA Instruments using a 50 millimeter cone, 0.053 gap. A rate sweep was run from 400 to 4 $S^{-1}$.

Figure 3:
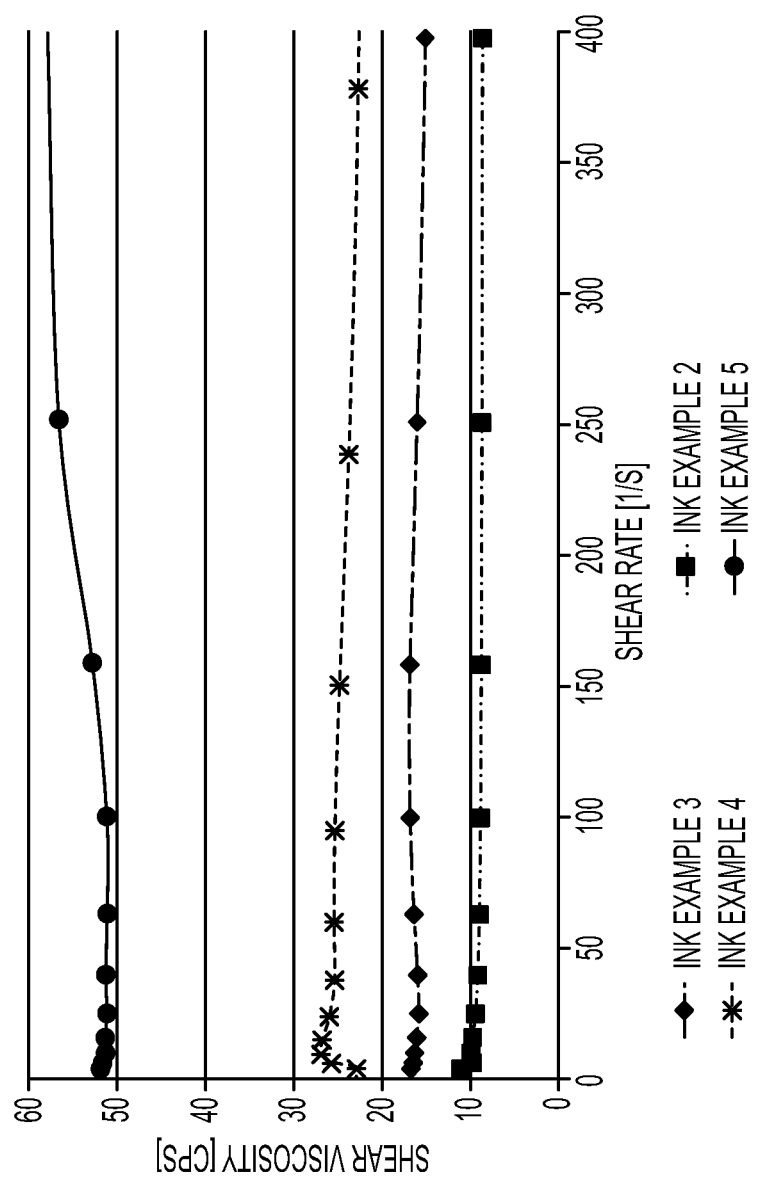
FIG. 3 is a graph showing shear viscosity (y-axis, centipoise) versus shear rate (x-axis, 1/s) for selected ink examples.

FIG. 3 illustrates shear viscosity (y-axis, centipoise) versus shear rate (x-axis, 1/s) for Ink Examples 2, 3, 4, and 5. As shown in FIG. 3, ink viscosity gradually increases as polymer loading increases.

Figure 4:
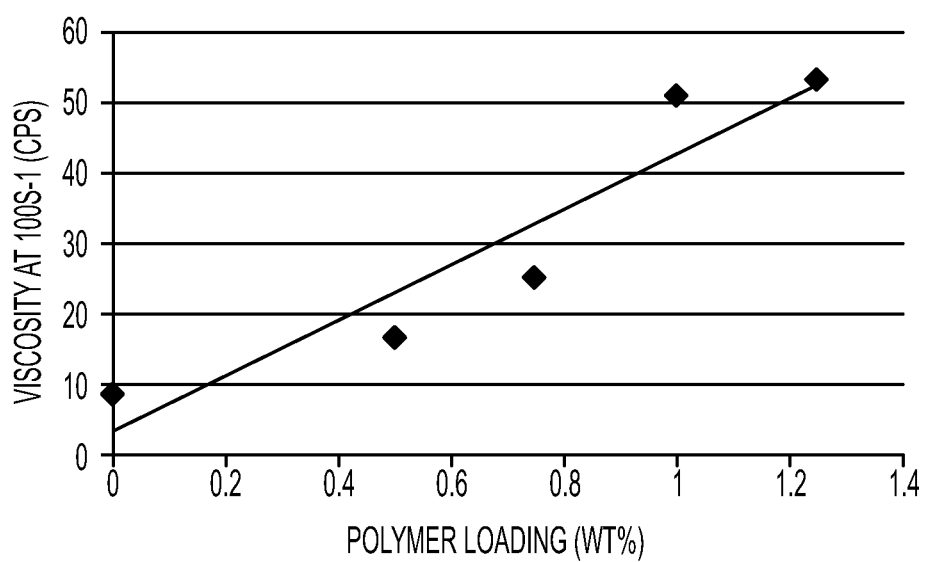
FIG. 4 is graph showing the effect of polymer loading on viscosity.

FIG. 4 illustrates viscosity at 100 $S^{-1}$ (y-axis, centipoise) versus polymer loading (x-axis, weight percent).

Conductivity lines for Ink examples 2, 3, 4, 5, and 6 were printed using a Flexi-proof printer (RK Printcoat Instruments, Royston, UK) and evaluated for conductivity. An FAM™ 0.067" plate and an anilox roller with a dual transfer volume of 5 and 6 ml/$m^2$ were used. Pressure from anilox to blanket and from blanket to substrate was 100 arb. The Flexi-proof was run at a speed of 30 m/minute (0.5 m/s). The prints were sintered in an oven at 130° C. for 30 minutes.

Resistance measurements on the printed conductivity lines were taken using a FLUKE® 177 True RMS Multimeter. The thickness of these lines was measured using a Dektak Profilometer and resistivity and conductivity of the samples was then calculated. The summarized data is shown in Table 3.

TABLE 3

| Ink Example | Poly(4-methylstyrene) Wt % | Average Resistivity (Ohm-m) | Average Conductivity (s/cm) | X Bulk Silver Conductivity |
|---|---|---|---|---|
| 2 | 0 | 9.57E−08 | 1.04E+05 | 6.03 |
| 3 | 0.50 | 2.83E−07 | 3.53E+04 | 17.83 |
| 4 | 0.75 | 2.18E−07 | 4.59E+04 | 13.73 |
| 5 | 1 | 1.56E−07 | 6.41E+04 | 9.83 |
| 6 | 1.25 | 5.06E−07 | 1.98E+04 | 31.88 |

Resistivity is an average of 50, 100, 600 and 1,000 micrometer lines (measured the 2 lines on each side) and 2 prints were assessed. Bulk silver conductivity is the bulk silver conductivity (6.3×$10^5$ s/cm) divided by the sample conductivity. A very conductive sample will give a value of 1. Adding the poly(4-methylstyrene) decreased conductivity especially for the sample with 1.25% poly(4-methylstyrene).

Conductivity values for these inks do not follow an expected trend. The Ink Example 5 with 1% polymer has very high conductivity, almost approaching that of the control Ink Example 2. As one adds the polymer additive, conductivity decreases and then increases significantly at 1% polymer and then decreases again. These experiments have been repeated and the same trend was observed. It is not yet clear why this unexpected trend occurred. The conductivity of the inks is acceptable. A bulk conductivity of around 20× is acceptable for applications such as OLED and OPV.

Ink examples 1 and 5 were printed using a gravure fixture. Images made from Ink example 1 (low viscosity ink with no polymer additive) had drag-out (overspreading) resulting in very poor print quality. The drag-out is believed to be due to the relatively low ink viscosity. Ink Example 5 with 1% polymer and higher viscosity gave gravure prints with significant improvement in print quality. The drag-out was significantly improved resulting in better print features. Gravure printed conductive lines were integrated as electrodes for p-type thin film transistor (TFT) devices, which showed the similar electrical performance as control device prepared using inkjet method (no polymer additive was used), indicating that poly(4-methylstyrene) was not negatively impacting ink performance.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A nanosilver ink composition comprising:
   silver nanoparticles;
   poly(4-methylstyrene); and
   an ink vehicle;
   wherein the poly(4-methylstyrene) is present in the ink composition in an amount of 1 percent by weight based on the total weight of the ink composition.

2. The nanosilver ink composition of claim 1, wherein the silver nanoparticles are present in the ink composition in an amount of from about 40 to about 75 percent by weight based on the total weight of the ink composition.

3. The nanosilver ink composition of claim 1, wherein the silver nanoparticles comprise elemental silver, a silver alloy, or a combination thereof.

4. The nanosilver ink composition of claim 1, wherein the silver nanoparticles comprise silver-containing nanoparticles having a stabilizer associated with a surface of the silver nanoparticle, the stabilizer consisting of an organoamine stabilizer.

5. The nanosilver ink composition of claim 1, wherein the silver nanoparticles comprise silver-containing nanoparticles having a stabilizer on the surface thereof wherein the stabilizer is an organoamine.

6. The nanosilver ink composition of claim 1, wherein the silver nanoparticles have a volume average particle diameter of from about 0.5 to about 100 nanometers.

7. The nanosilver ink composition of claim 1, wherein the ink vehicle comprises a non-polar solvent.

8. The nanosilver ink composition of claim 1, wherein the ink vehicle comprises a member of the group consisting of decalin, bicyclohexyl, xylene, hexadecane, toluene, tetradecane, methyl naphthalene, tetrahydronaphthalene, tetramethyl benzene, ethyl benzene, and mixtures and combinations thereof.

9. The nanosilver ink composition of claim 1, wherein the ink vehicle comprises a mixture of decalin and bicyclohexyl.

10. The nanosilver ink composition of claim 1, wherein the ink vehicle is present in the ink composition in an amount of from about 5 to about 50 percent by weight based on the total weight of the ink composition.

11. The nanosilver ink composition of claim 1, wherein the ink has a viscosity of from about 15 to about 60 centipoise at a temperature in the range of from about 20 to about 30° C. and shear rate of from about 40 to about 400 $s^{-1}$.

12. The nanosilver ink composition of claim 1, wherein the ink has a bulk conductivity that is more than about 50,000 S/cm.

13. The nanosilver ink composition of claim 1, wherein electrically conductive lines prepared with the nanosilver ink composition, have a line thickness of from about 0.1 to about 20 micrometers.

14. A process for preparing a nanosilver ink composition comprising:

combining silver nanoparticles; poly(4-methylstyrene); and an ink vehicle;

wherein the poly(4-methylstyrene) is present in the ink composition in an amount of 1 percent by weight based on the total weight of the ink composition.

15. The process of claim 14, wherein the ink has a viscosity of from about 15 to about 60 centipoise at a temperature in the range of from about 20 to about 30° C. and shear rate of from about 40 to about 400 $s^{-1}$.

16. The process of claim 14, wherein the ink vehicle is a mixture of decalin and bicyclohexyl.

17. A process comprising:

providing a nanosilver ink composition comprising silver nanoparticles; poly(4-methylstyrene); and an ink vehicle; wherein the poly(4-methylstyrene) is present in the ink composition in an amount of 1 percent by weight based on the total weight of the ink composition;

depositing the nanosilver ink composition onto a substrate to form deposited features; and heating the deposited features on the substrate to form conductive features on the substrate.

18. The process of claim 17, wherein the process comprises a flexographic printing process or a gravure printing process.

19. The process of claim 17, wherein the conductive features comprise conductive lines having a line thickness of from about 0.1 to about 20 micrometers.

* * * * *